(12) United States Patent
Demoustier et al.

(10) Patent No.: US 7,852,888 B2
(45) Date of Patent: Dec. 14, 2010

(54) LASER SOURCE WITH COHERENT BEAM RECOMBINATION

(75) Inventors: Sebastien Demoustier, Paris (FR);
Amaud Brignon, Bourg-la-Reine (FR);
Jean-Pierre Huignard, Paris (FR);
Laurent Mugnier, Meudon (FR);
Jerome Primot, Chatillon (FR)

(73) Assignee: Thales (FR)

( * ) Notice: Subject to any disclaimer, the term of this patent is extended or adjusted under 35 U.S.C. 154(b) by 522 days.

(21) Appl. No.: 12/063,619

(22) PCT Filed: Aug. 10, 2006

(86) PCT No.: PCT/EP2006/065203

§ 371 (c)(1),
(2), (4) Date: Feb. 12, 2008

(87) PCT Pub. No.: WO2007/020224

PCT Pub. Date: Feb. 22, 2007

(65) Prior Publication Data

US 2010/0142574 A1    Jun. 10, 2010

(30) Foreign Application Priority Data

Aug. 12, 2005 (FR) .................................. 05 08542

(51) Int. Cl.
*H01S 3/00* (2006.01)
*G02B 26/00* (2006.01)

(52) U.S. Cl. .............................. 372/29.023; 372/29.02; 359/237

(58) Field of Classification Search .............. 372/29.02, 372/29.023, 9
See application file for complete search history.

(56) References Cited

U.S. PATENT DOCUMENTS

| 5,034,627 A | 7/1991 | Ayral et al. |
| 5,045,719 A | 9/1991 | Ayral et al. |

(Continued)

OTHER PUBLICATIONS

Kendrick, R. L. et al. "Phase-Diversity Wave-Front Sensor for Imaging Systems." Applied Optics, OSA, Optical Society of America, Washington, DC, US, vol. 33, No. 27, Sep. 20, 1994, pp. 6533-6546, XP000469298. OSSM 0003-6935.

(Continued)

*Primary Examiner*—Minsun Harvey
*Assistant Examiner*—Phillip Nguyen
(74) *Attorney, Agent, or Firm*—Lowe Hauptman Ham & Berner, LLP

(57) ABSTRACT

A laser source is disclosed with coherent recombination of N spatial monomode laser beams having N phase shifters controlled by a phase-lock device (3). The phase-lock device has an optical device (30) capable of taking at least a portion of each of the N beams. The optical device has an optical element (32) capable of applying a phase deformation, and at least one matrix ($M_1$) of detectors capable of detecting a first image (im) of a wave surface corresponding to the N beams. The matrix ($M_1$) of detectors also detects a second image ($im_d$) deformed by the optical element (32). Processing means (31) are provided for processing the first and second images. The processing means are configured so as to measure the phase pistons between on the sub-pupils ($sp_j$) corresponding to the N beams and to apply phase corrections $c(\phi)$ to each of the N beams, by means of said N phase shifters so as to minimize the phase pistons.

20 Claims, 5 Drawing Sheets

U.S. PATENT DOCUMENTS

| | | |
|---|---|---|
| 5,121,400 A | 6/1992 | Verdiell et al. |
| 5,384,455 A | 1/1995 | Paxman |
| 5,394,412 A | 2/1995 | Huignard et al. |
| 5,396,506 A * | 3/1995 | Ball .............................. 372/6 |
| 5,430,454 A | 7/1995 | Refregier et al. |
| 5,994,687 A * | 11/1999 | Chanteloup et al. ...... 250/201.9 |
| 6,714,581 B2 * | 3/2004 | Corcoran .................... 372/101 |
| 6,834,061 B2 | 12/2004 | Huignard et al. |
| 2003/0206350 A1 | 11/2003 | Byren et al. |
| 2004/0056174 A1 | 3/2004 | Specht et al. |
| 2008/0055700 A1 | 3/2008 | Bourderionnet et al. |
| 2008/0253415 A1 * | 10/2008 | Livingston ............... 372/38.01 |

OTHER PUBLICATIONS

R.G. Paxman, S.L. Crippen. "Aberratio Correction for Phased-Aray Telescopes Using Phase-Diversity." SPIE, vol. 1351, 1990, pp. 787-797, XP002366377.

Pending Unpublished U.S. Appl. No. 11/722,676, filed Jun. 22, 2007, Bourderionnet et al.

* cited by examiner

Transmittance of the aberrant pupil 41:

FIG.5
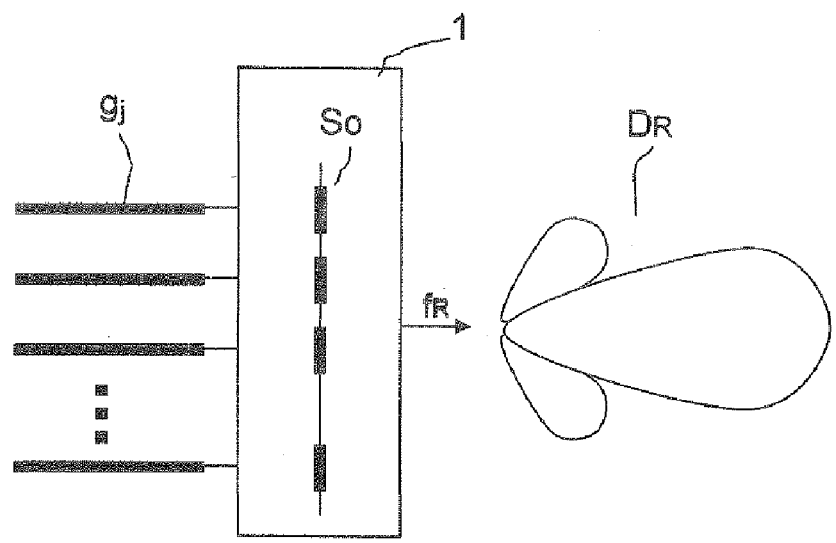
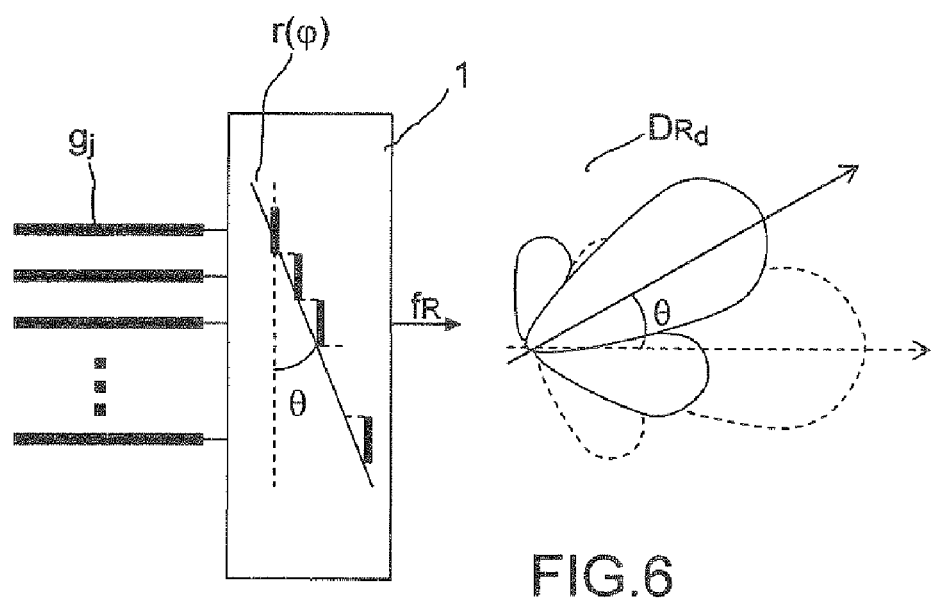
FIG.6

LASER SOURCE WITH COHERENT BEAM RECOMBINATION

CROSS-REFERENCE TO RELATED APPLICATIONS

The present Application is based on International Application No. PCT/EP2006/065203, filed on Aug. 10, 2006, which in turn corresponds to French Application No. 05 08542, filed on Aug. 12, 2005, and priority is hereby claimed under 35 USC §119 based on these applications. Each of these applications are hereby incorporated by reference in their entirety into the present application.

FIELD OF THE INVENTION

The present invention relates to a laser source with coherent beam recombination, in particular to a high-power laser source.

BACKGROUND OF THE INVENTION

Coherent recombination of laser beams is a technique used to solve the problem of flux stability limitation of gain materials for the purpose of obtaining a high-power laser source. In particular, high-power fiber laser sources are thus produced. This technique makes it possible to obtain a laser beam of high luminance, but also of high coherence and high optical quality (diffraction limited). Laser sources based on coherent beam recombination thus make it possible to envisage power levels that it would not be possible to obtain from a single fiber, owing to the flux stability limitation. To give an example, an ytterbium-doped polarization-maintaining fiber laser makes it possible to extract 500 W of monomode continuous power. A laser source comprising a bouquet of around one hundred of these fibers, with a coherent recombination system, would allow 50 kW of monomode power to be extracted, which power is impossible to obtain from a single fiber. This shows the great benefit of coherent beam recombination.

The general principle of this coherent recombination technique, in which N elementary laser beams are recombined, is to distribute the necessary amplification over N gain media undergoing spatial monomode propagation. The summation of N coherent beams is carried out, as output from the N gain media. N is chosen to be as large as necessary depending on the intended application. The beams to be recombined may in practice be in the form of a one-dimensional (1D) array or a two-dimensional (2D) array as a P×Q. matrix. In the rest of the description, the case of a 1D array is considered, but everything that is described can apply just as well to a 2D array.

Coherent recombination thus consists in summing N coherent beams of the same polarization in parallel, each amplified by propagation in a gain medium. If the N laser beams that emerge from the N gain media are in phase, they interfere constructively and thus constitute a source having a luminance of $N^2$ times greater than that of an elementary amplifier (i.e. 1 beam and 1 gain medium), while maintaining its beam quality (diffraction limited in the case of monomode fibers for example).

However, the N beams follow different propagation paths, and thus undergo different phase variations. These phase variations are due to index variations of many origins: environmental conditions (temperature, vibrations, mechanical stresses, etc.) passages through pumped gain media, etc. These various phase perturbations vary with time.

Thus, these laser sources require a dynamic control device for controlling the phase of each beam, which allows the phase differences between the various beams to be corrected and cancelled out in real time. This ensures that the laser beam resulting from the recombination is very stable under severe environmental conditions. Furthermore, such a device makes it easier to take into account any missing element.

Dynamically controlling the phase of each beam has other known advantages, such as that of providing a beam scanning function. This is particularly beneficial in optronic applications, such as for example designation, tracking or pointing, or communications in free space.

A diagram showing the principle of a laser source based on coherent beam recombination according to the prior art is illustrated in FIG. 1.

This source comprises N incident laser beams $Li_j$, where j=1 to N, N phase shifters $D_j$—one per incident laser beam—and N spatial monomode propagation channels $g_j$—one per incident laser beam. In the case of a high-power laser source, these propagation channels are preferably gain media, advantageously fiber amplifiers. The N incident laser beams are spatial monomode beams of the same polarization.

A coherent recombination system 1 receives a beam made up of N laser sub-beams $La_j$, obtained as output from the N channels $g_j$. It delivers a recombined laser beam $f_R$ as output.

The coherent recombination system comprises a device 2 for taking a part of the output beam to a phase-lock device 3. This phase-lock device delivers the feedback signal to each of the phase shifters $D_j$. The device 2 may for example comprise an array of microlenses in an example of coherent recombination of free-space beams.

The phase-lock device 3 generates feedback signals according to an appropriate feedback control algorithm applied to a tiny portion of the beam taken by the device 2. The device 3 measures, on this tiny portion of the beam taken, the phase differences between the sub-beams $La_j$. It generates the feedback signals to be applied to the phase shifters $D_j$ based on these measures. Each of the N phase shifters $D_j$ is thus under closed-loop feedback control via a corresponding feedback signal generated by the phase-lock device 3. This signal determines the effectiveness of the coherent recombination system 1 in bringing the N beams $La_j$ at the output of the channels $g_j$ into phase.

The invention relates more particularly to the phase-lock device 3. This phase-lock device must meet various constraints, which determine the efficiency of the coherent recombination system 1 in bringing the beams into phase.

A first constraint is the rate of phase correction. This is because gain media, which are preferably fiber gain media (i.e. fiber lasers), are generally very long and very sensitive to environmental perturbations. This imposes a high phase correction rate, typically of the order of several kHz.

A second constraint lies in the measurement to be made for correcting the phase. It is not a question of measuring the aberrations of a single beam, as in other imaging applications, since the coherent recombination system 1 receives N beams. Therefore the phase shifts between each of these N beams have to be measured so as to recombine them efficiently. However, this does not mean analyzing all the aberrations either: since the N beams are all monomode, each is thus virtually diffraction-limited and free of aberration. The phase shifts to be measured and to be corrected thus correspond to zero-order aberrations, that is to say phase pistons, and possibly to 1st-order aberrations, that is to say "tilts".

It may be considered that each of the beams received is seen by the coherent recombination system as a sub-pupil. Each of the N sub-pupils seen by the coherent recombination system is phase-shifted relative to the other sub-pupils by a constant phase shift, i.e. by a piston, that is to say a zero-order aberration, or by a tilt of the wave surfaces of each of the pupils, that is to say a 1st-order aberration.

A phase-lock device for a beam recombination system must allow these aberrations to be measured and corrected, at the necessary rate, in order to be very effective.

Various systems for measuring and correcting the phase are known.

In a system based on an interferometric analysis method, the phase shift between the sub-pupil of each beam and a reference is measured. This reference may be delivered by one of the N beams, or more simply by an additional, reference beam, which is phase-modulated. This reference beam acts as a local oscillator. If the propagation media are fiber gain media, the reference beam may be brought to the entry of the coherent recombination system via a non-amplifying fiber.

According to this method of analysis, the phase-lock device 3 goes back to the phase difference of each sub-pupil relative to the reference by demodulating the detected signals in phase quadrature.

This method of analysis has the drawback of being complicated to implement for a large number N of beams since, roughly, it consists in producing an interferometer for each sub-pupil. This therefore requires the provision of a detection system for each channel $g_j$ with the alignment problems that this entails, in addition to managing an additional reference beam. In practice, this method may be implemented for a small number of beams, typically up to N=4 for example. In a system in which there may be around one hundred beams, this method becomes very tricky to implement.

Another method is known, which uses the phase shifters $D_j$ (the bandwidth of which must be adapted accordingly) for impressing on each of the N beams, in addition to the phase correction, an RF phase modulation (at several tens or hundreds of MHz), i.e. a much more rapid modulation than the frequency of the phase corrections (typically less than a few tens of kHz). This modulation must be different for each beam. Each sub-pupil detected is thus discriminated from the others by a different RF frequency. The detection uses a single detector, typically a photodiode. The associated signal processing makes it possible to go back to the phase difference of each of the detected sub-pupils by analyzing the actual phase shift at each RF frequency. This method, which requires only a single detector, has the advantage of being simpler to implement than the interferometric analysis method. In addition, it does not require a reference beam. On the downside, it requires more complex processing electronics, especially electronics capable of generating N different RF frequencies. However, this is not its main drawback. This is because with such a method, for applications of the high-power laser source of the data transmission type in free-space communication systems, each of the N beams is modulated at an RF frequency, which frequency could lie within the bandwidth of the signals to be transmitted. This is a disadvantage that limits the application options of this method.

Also known are wavefront analyzers, especially phase-shift interferometers, multiple-wave interferometers, and wavefront analyzers of the Shack-Hartmann sensor type. However, these analyzers are ill-suited for phase-shift measurement in a coherent beam recombination system. This is because they are very complicated and difficult to implement. However, above all their correction rate is low, generally less than 1 kHz, thereby precluding a real-time correction at the desired rate. Furthermore, a Shack-Hartmann wavefront sensor does not allow zero-order aberrations (phase pistons) to be measured.

SUMMARY OF THE INVENTION

In the invention, a phase analysis device was sought which does not have the various disadvantages of the devices and methods of the prior art and which meets the desired performance characteristics as regards the capability of measuring zero-order and 1st-order aberrations, simplicity of implementation, and correction rate.

The idea at the basis of the invention is not to process the N beams separately but to consider the output from the N channels $g_j$ as one object, of which an image whose aberrations it is desired to correct is taken.

According to the invention, a "phase diversity" processing method is applied to this image in order to correct at least the zero-order aberrations (pistons) thereof.

Phase diversity is a known processing method used in imaging, and especially in astronomy, in particular to correct the images received on a telescope. More particularly, phase diversity is used in this field for correcting a wave surface or wavefront disturbed by the propagation in the atmosphere or by the misalignments of the imaging system (the telescope). It is also used in what are called "cophasing" sensors for producing large-diameter telescopes by optical aperture synthesis, interferometrically recombining several sub-pupils of smaller diameters, which may be segments of primary mirrors or of separate telescopes.

In a simplified manner, the phase diversity method as normally used to improve the resolution of an imaging system, such as a telescope, consists in analyzing a focal image and a defocused image, linked by a known nonlinear relationship. It has the advantage of being simple to implement from the set-up standpoint. On a downside, adaptive image processing means are required.

The method may be described as follows, in relation to FIG. 2:

Consider an object o, an image i of which it is desired to form. The telescope 4 is used to acquire the image i of the object o in the focal plane of the telescope. It is possible to go back to the object o and to its aberrant phase from this detected image i. To do this, a second, defocused image i' of the object o is acquired. This second image is produced by means of a deforming element 5, which adds a known deformation to the wave surface. Thus, additional information about the phase is obtained thanks to the acquisition of the first image i and the second image i'. The two images i and i' obtained are linked by a relationship characteristic of the deformation induced by the deforming element 5. Adaptive signal processing then makes it possible to go back both to the aberrant phase and to the object o. The second image i' has therefore provided the phase measurement with "diversity", hence the name of this method. Typically, the diversity may be provided simply by defocusing the image plane by a known length $\Delta Z$, for example by means of a glass plate as illustrated in FIG. 2. In practice, several images may be used to measure the optical aberrations.

According to the invention, a phase-lock device of the phase-diversity type is used in a coherent beam recombination system to analyze the phase differences between the beams and to control the phase shifters adaptively so as to obtain, as output, an optimally recombined beam.

This thus involves a very different approach from the prior art, by analyzing the phase collectively, that is to say by not considering the incident beam as a juxtaposition of N beams, but rather as a single beam, the image of which it is desired to form. If all the N beams are in phase, the observed image will virtually be that of a single main lobe. The less the phase differences are controlled, the more this lobe will diminish and the more chaotic the image will be.

The invention makes it possible to deal with high-power laser sources based on a large number of beams arranged in a 1D or 2D array. To give an example, it allows a source comprising a 2D array of beams, for example 10×10 beams to be easily dealt with.

The invention therefore relates to a laser source with coherent recombination of N spatial monomode laser beams, comprising N phase shifters controlled by a phase-lock device, characterized in that said phase-lock device comprises:

an optical device comprising means for taking at least a portion of each of said N beams, said optical device comprising an optical element for applying a phase deformation, and at least one matrix of detectors for detecting a first image of a wave surface corresponding to said N beams, and a second image deformed by said optical element; and processing means for processing said first and second images, said processing means comprising means for measuring the phase pistons between the sub-pupils corresponding to said N beams and for applying phase corrections to each of the N beams, by means of said N phase shifters so as to minimize said phase pistons, in order to deliver an optimized recombined laser beam as output.

The processing means may furthermore measure phase tilts and determine corresponding phase corrections.

The optical deforming element is preferably an element for defocusing by a known distance.

Preferably, the N laser beams are amplified by gain media, so as to obtain a high-power laser beam as output, these preferably being fiber amplifiers.

In a variant, said optical device furthermore applies a shaping operation on the recombined beam as output, by impressing a wave surface profile approximated by phase pistons juxtaposed with said phase corrections.

Said approximated profile may be a phase ramp, a phase function for precorrecting subsequent perturbations or, more generally, a shaping function according to the use of the beam.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5 illustrates the radiation pattern and the corresponding wave surface obtained with a laser source according to the invention;

FIG. 6 illustrates the radiation pattern and the corresponding wave surface obtained with a laser source according to the invention in the case in which a beam scanning function is implemented;

DETAILED DESCRIPTION OF THE INVENTION

Figure 3:
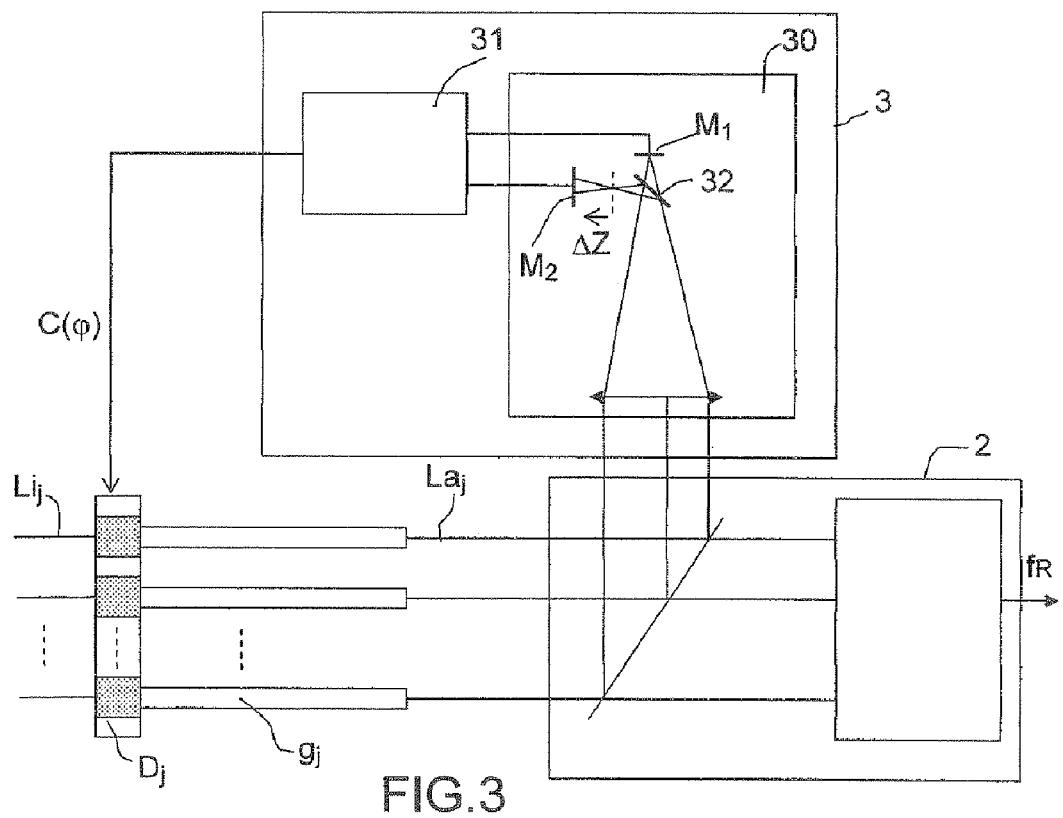
FIG. 3 illustrates a laser source based on coherent beam recombination implementing such a phase diversity method in order to carry out phase-lock control.

In the invention, the phase diversity method is applied to the coherent recombination of N beams in a laser source, as illustrated in FIG. 3. Within this context, the illumination is coherent.

The phase-lock device 3 therefore comprises a first matrix $M_1$ and a second matrix $M_2$ of high-speed detectors, the first for detecting the image i of the wave surface emitted as output from the N monomode propagation channels $g_j$ and the second for detecting the deformed image $i_d$ on an optical element 32 applying a phase deformation. The phase-lock device 3 further includes a signal processing device 31 capable of carrying out computations of the Fourier transform type, autocorrelation type, etc., in order to determine the aberrant phase of the image i and to deduce therefrom the phase corrections to be applied as input of each of the channels $g_j$, to the N phase shifters $D_j$.

It should be noted that it is quite possible, and known, to detect both images i and $i_d$ on a single matrix of detectors. This situation may be implemented by a person skilled in the art without any particular difficulty.

Such a phase-lock device according to the invention is simple to implement as it requires only one or two detector matrices. There is no reference beam to be provided, nor any modulation of the useful signal.

In a simple exemplary embodiment, the optical deforming element 32 is an element that defocuses by a known distance $\Delta Z$, typically a plate of thickness $\Delta Z$. The phase therefore undergoes a nonlinear deformation. In this example, the deformation is known, thereby simplifying the data processing, but it is quite possible to use a phase deforming element that applies any deformation. The sole limitation comes from the number of parameters needed to model the deformation, which makes the data processing for accessing these parameters relatively complex.

Hereafter, the simple case of an optical element 32 is considered, this being an element that defocuses by a known distance.

Figure 1:
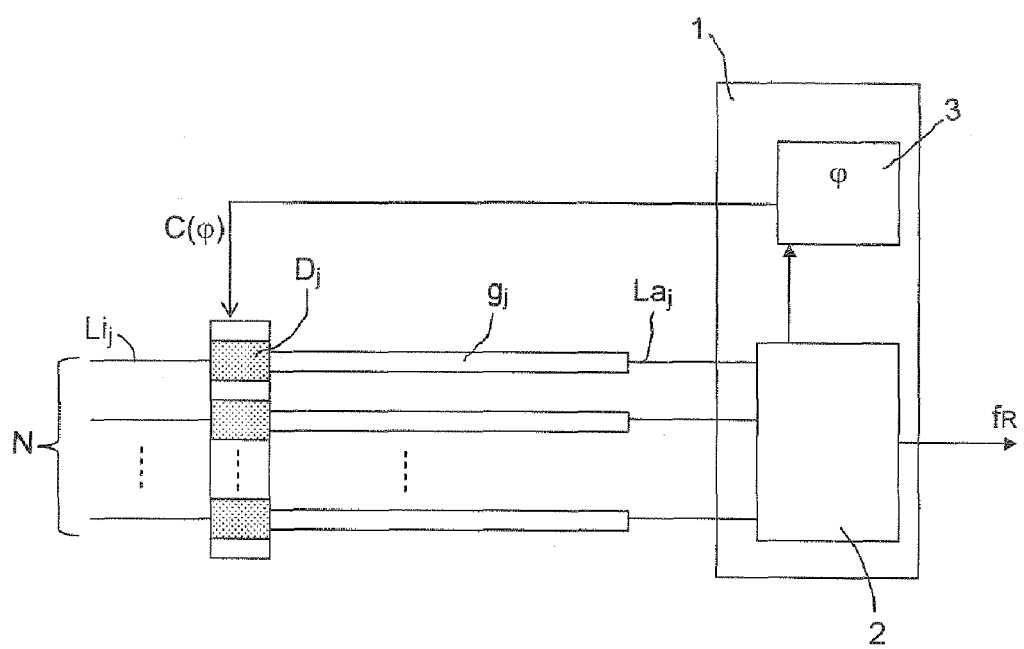
FIG. 1, already described, is a block diagram of a laser source based on coherent beam recombination according to the prior art.
Figure 2:
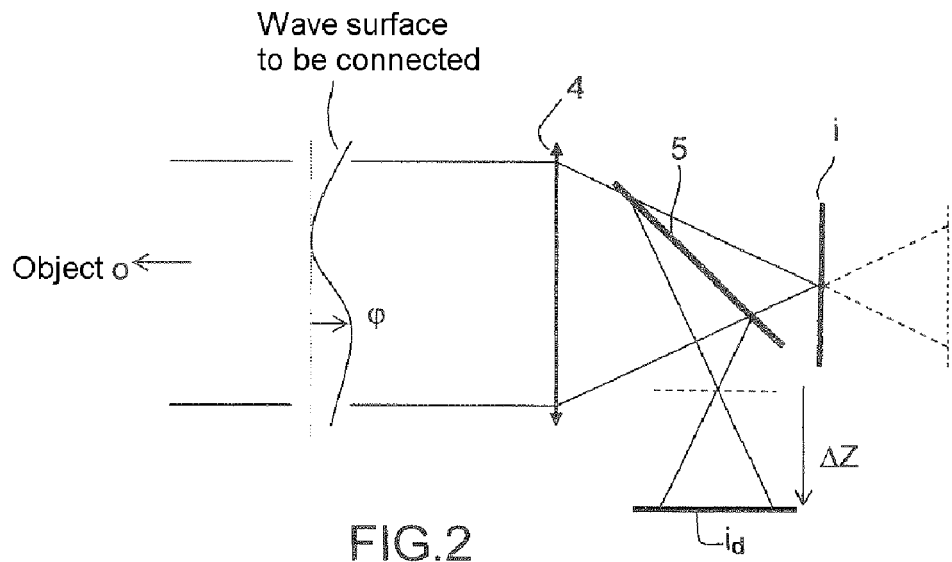
FIG. 2, already described, is an illustration of an imaging system for a telescope employing the phase diversity method in order to improve the quality of the detected image.
Figure 4A:
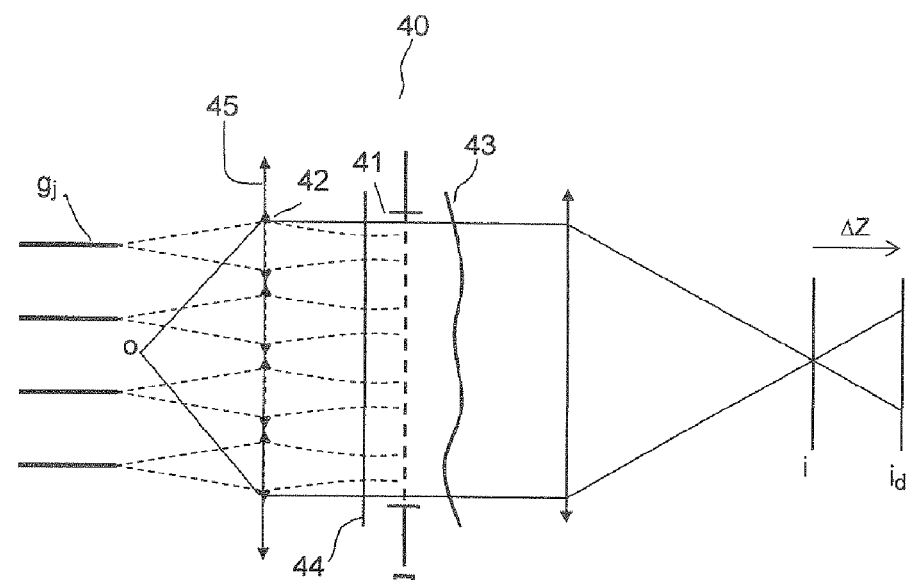
FIGS. 4a to 4c illustrate an optical system for analyzing the transmittance of a pupil, in order to analyze the phase difference between the sub-pupils corresponding to the various sub-beams forming the image.
Figure 4B:
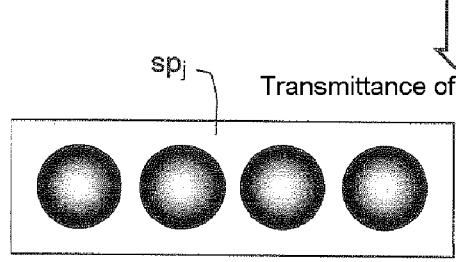
Figure 4C:
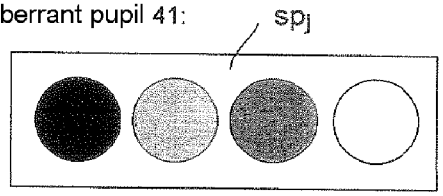

FIG. 4 illustrates schematically the phase analysis principle according to the invention, to be compared with FIG. 2. Instead of a far object o (FIG. 2) as illumination source, here there are N coherent spatial monomode beams emitted as output of N channels $g_j$, which arrive on a device 40. An array of N collimating microlenses 42—one per beam—is provided on the entry side. At the pupil 41, N collimated monomode laser beams are obtained. These N beams have a spherical Gaussian profile.

For the needs of the modeling, and to draw a parallel with the device shown in FIG. 2 used in astronomy, the aberrant wave 43 may be modeled by a perfect plane wave 44 passing through an aberrant pupil 41 which has for transmittance, the phase and amplitude distributions of the n monomode beams in the plane of the waist. It will be recalled that the waist of a beam is the place where the phase of the beam is plane and where the beam is of smallest diameter.

The method thus consists in analyzing the pupil equivalent to the wave surface 43 emitted by an array of N laser beams output by the N channels $g_j$.

It will be recalled that a laser beam has a spherical Gaussian field distribution. Thus, the transmittance of the virtual pupil 41 placed at the waist of the N beams is the juxtaposition of N sub-pupils $sp_j$ having a Gaussian amplitude distribution (illustrated in FIG. 4b) and a phase distribution (illustrated in FIG. 4c) that are constant over each of the sub-pupils $sp_j$, but offset between them by the phase shift that it is desired to correct.

Assuming that the beams are perfectly parallel to the propagation axis, the tilts of the sub-pupils are zero.

As regards the modeling, the system is therefore equivalent to that of a known point object o and of a collimating lens 45 emitting a plane wave 44 perturbed by passage through an aberrant pupil 41, having the above-mentioned characteristics.

The following assumptions are made:
the illumination is spatially coherent and monochromatic; and
the device 40 is a linear and translationally invariant system.

The image field i in the focal plane of the optical device 40 is related to the object o by the equation:

$$i(x) = o(x) * h(x)$$

where * is the convolution operator, i and o are the image and object fields and h is the impulse response of the optical device 40 (propagation, optical instrument and sensor); here the noise terms that would taint the image (i=o*h+b) are neglected.

The image of intensity Im, seen by a matrix detector $M_1$, typically a CCD detector, placed at the focus of the analysis system is then $Im = |i|^2 = i \times i^*$.

When in the plane of the pupil, this equation becomes, in frequency space:

$$I = O \times H,$$

where I, O and H are the Fourier transforms of i, o and h. H is the transfer function of the optical device 40.

Since the incident wave is assumed to be plane before being perturbed by the pupil 41, O(x) is in our case a Dirac function. Therefore O(u)=1 and i(x)=h(x).

In addition, we may write:

$$H(u) = \sum_{n=1}^{N} P(u - u_n) e^{i\varphi_n(u)}$$

where P is the amplitude of the spherical Gaussian wave of each beam.

The phase of each of the beams is decomposed on the basis of the Zernike polynomials:

$$\varphi_n(u) = \sum_i \alpha_{i,n} Z_i(u - u_n).$$

By assuming that the sub-pupils are phase-shifted only by a piston, it is possible to truncate the above sum to the 1 order polynomial, i.e. $\phi_n(u) = \alpha_n$. It will be noted that for taking tilts into account, it would be necessary to truncate to the 3 order polynomial.

Therefore, in the focal plane, the following may be written:

$$H(u) = \sum_n P(u - u_n) e^{i\alpha_n}.$$

The phase diversity is provided by defocusing the focal plane by the amount $\Delta Z$. To denote the quantities corresponding to the defocused image $im_d$, we will use the same notations, but with the suffix d, i.e.:

$$H_d(u) = \sum_n P(u - u_n) e^{i(\varphi_n(u) + \varphi_d(u))}$$

where $\phi_d$ is the phase diversity provided by the defocusing:

$$\varphi_d(u) = \frac{\pi \Delta Z}{\lambda f^2} |u|^2.$$

Thus, knowing o and $\phi_d$, and by measuring the intensities Im and $Im_d$ of the observed images i and $i_d$, we are able by appropriate signal processing to go back to the desired phases $\phi_n$.

This processing may for example consist of an optimization of a criterion J as a function of N pistons $\alpha_n$.

For example, a criterion J resulting from the least-squares method may be used, i.e.

$$J(\alpha_1, \ldots, \alpha_n) = \|Im - ii^*\|^2 + \|Im_d - i_d i_d^*\|.$$

The optimization of such a criterion J then consists in minimizing the difference between the intensities Im and $Im_d$ and the intensities of the images reconstructed from the estimation of the pistons $\phi_n$ in the expressions for H.

By applying Parseval's theorem and using I(u)=H(u), the following may be written:

$$J = \sum_u |TF[Im] - H \otimes H|^2 + \sum_u |TF[Im_d] - H_d \otimes H_d|^2.$$

The N desired pistons $\alpha_n$ are then those which set this criterion J to zero.

The invention is not limited to just this criterion. Other criteria that are more sophisticated and astute may be employed without departing from the spirit of the invention.

In the foregoing, only zero-order phase shifts (phase pistons) were considered. It should be noted that to take the tilts into account requires only adding two 1st-order terms in the decomposition of the phase on the basis of Zernike polynomials.

Thus, a phase-lock device 3 according to the invention as illustrated in FIG. 3 makes it possible, by just the acquisition of two defocused images, or more generally images linked by a phase relationship, to simply go back to the phase shifts that it is desired to correct, and makes it possible to bring each of the N sub-pupils of the beams output by the channels $g_j$, seen collectively as a plane wave, into phase, that is to say annulling the relative phase pistons.

It is possible to obtain the recombination in far field of a beam $f_R$, the radiation pattern $D_R$ of which is monomode, as illustrated in FIG. 5, and to do so without power limitation. This figure illustrates schematically the corresponding wave surface $S_O$ obtained by annulling the N relative phase pistons $p_j$ by a coherent recombination system employing a phase analysis and correction device according to the invention.

What is thus obtained is shaping of the beam $f_R$ and generation of an optical wave surface that are optimized for the application.

This in-phase shaping function illustrated in FIG. 5, which consists in annulling all the pistons, is the most elementary function that a phase analysis and correction device according to the invention may employ.

It is possible to employ more elaborate shaping functions to generate more complex wave surface profiles for use in various applications.

This shaping of the beam $f_R$ with optical wave surface generation is most meaningful when the number N of beams (or sub-pupils) in question is very large. This is because only the piston of each sub-beam, i.e. a phase "plateau", is controlled, and the resulting overall wave surface is therefore made up of "staircase steps". The more numerous the steps, i.e. the larger N, the closer the emitted wave surface approaches the desired shape.

A more elaborate beam shaping example involves the deflection or scanning of the beam $f_R$, which applies in particular to optronic applications such as for example designation, tracking or aiming, or free-space communications.

To produce such a beam deflection, in addition to annulling the relative phase pistons between the sub-pupils, a phase ramp profile r is impressed in such a way that each of the sub-pupils is shifted by a constant phase piston $p_j$ relative to its neighbors. This is what FIG. 6 illustrates.

The main lobe of the radiation pattern $D_R$ is deflected through the angle $\theta$ of the phase ramp. On the downside, its amplitude is somewhat reduced.

As explained earlier, the larger the number N of beams, the better the approximation of the ramp by the phase pistons. A very good resolution of the pointing error is then obtained.

Figure 7:
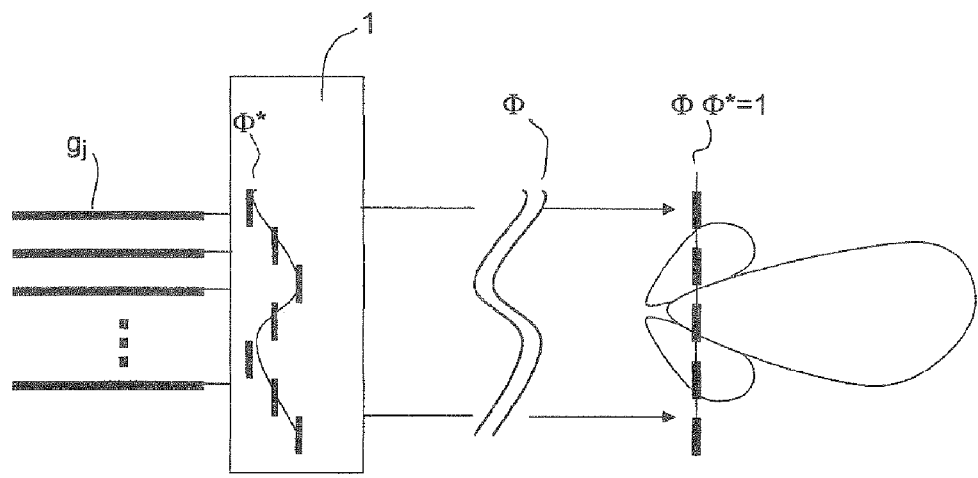
FIG. 7 illustrates another radiation pattern and the corresponding wave surface that may be obtained with a laser source according to the invention, when a precorrection of the subsequent perturbations of the recombined beam is implemented.

Another implementation example is illustrated in FIG. 7. In addition to the phase correction for annulling the relative phase pistons associated with the transmission of the beams in the channels $g_j$, a phase function $\Phi^*$ approximated by phase pistons $p_j$, is impressed so as to precorrect the atmospheric perturbations $\Phi$ that the recombined beam $f_R$ as output will encounter when it propagates in free space. In the surface plane in which the recombined laser beam $f_R$, is received, the phase pistons are zero. This typically relates to optronic and telecommunication applications.

Figure 8:
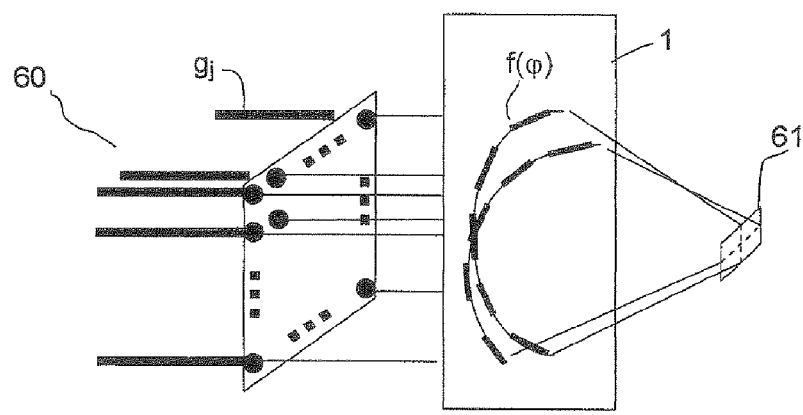
FIG. 8 illustrates the radiation pattern and the corresponding wave surface obtained with a laser source according to the invention, when a beam shaping function is implemented in the case of a 2D array of laser beams.

In a similar variant, it is possible to impress wave surface profiles of diverse forms for diverse applications. For example, starting from a two-dimensional matrix array 60 of channels $g_j$, it is possible to impress a phase function $f(\phi)$ such that the beam is focused as a rectangular spot 61, as illustrated in FIG. 8, and to do so without any additional optical element. This may be applied in particular to applications of the surface grinding type using a laser beam.

Thus, treating the N beams collectively as a single image benefits from a collective method that allows the phase on a very large number N of beams to be analyzed. To give an example, the phase diversity systems used in astronomy make it possible to process and optimize images consisting of 512× 512 pixels with several adjustment parameters per pixel. In the invention, there is only a small number of adjustment parameters—three at most—namely the piston and optionally the tilt in two directions of each of the N monomode beams. The number N of beams that can be treated with such a coherent recombination system according to the invention may be correspondingly larger.

The invention applies in particular to high-power laser sources based on coherent recombination of beams using gain media as spatial monomode propagation channels $g_j$, and applies especially to high-power fiber laser sources, that is to say those in which the gain media $g_j$ are fiber amplifiers.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A laser source with coherent recombination of N spatial monomode laser beams, comprising N phase shifters controlled by a phase-lock device, said phase-lock device comprising:

an optical device comprising means for taking at least a portion of each of said N beams, said optical device comprising an optical element for applying a phase deformation, and at least one matrix of detectors for detecting a first image of a wave surface corresponding to said N beams, and a second image deformed by said optical element; and processing means for processing said first and second images, said processing means comprising means for measuring the phase pistons between the sub-pupils corresponding to said N beams and for applying phase corrections to each of the N beams, by means of said N phase shifters so as to minimize said phase pistons, in order to deliver an optimized recombined laser beam as output.

2. The laser source as claimed in claim 1, wherein said processing means are configured so as furthermore to measure phase tilts between the sub-pupils and to apply phase corrections to each of the N beams, by means of said N phase shifters so as to minimize said phase pistons.

3. The laser source as claimed in claim 1, wherein the optical deforming element is an element for defocusing by a known distance.

4. The laser source as claimed in claim 1, wherein said processing means apply a least-squares phase-piston minimization function.

5. The laser source as claimed in claim 1, comprising N gain media delivering said N laser beams as output.

6. The laser source as claimed in claim 5, wherein said gain media are fiber amplifiers.

7. The laser source as claimed in claim 1, wherein said processing means are capable of impressing on the output beam a wave surface profile approximated by phase pistons juxtaposed with said phase corrections.

8. The laser source as claimed in claim 7, wherein said profile is a phase ramp.

9. The laser source as claimed in claim 7, wherein said profile is a phase function for precorrecting the known perturbations of the recombined beam.

10. The laser source as claimed in claim 7, comprising a two-dimensional array of gain media, wherein said profile is a phase function defined so as to focus the recombined beam into a spot of specified shape.

11. An optronic beam scanning system, comprising
a laser source with coherent recombination of N spatial monomode laser beams, comprising N phase shifters controlled by a phase-lock device (3), characterized in that said phase-lock device comprising:
an optical device (30) comprising means for taking at least a portion of each of said N beams, said optical device comprising an optical element (32) for applying a phase deformation, and at least one matrix ($M_1$) of detectors for detecting a first image (im) of a wave surface corresponding to said N beams, and a second mane ($im_d$) deformed by sad optical element (32); and
processing means (31) for processing said first and second images, said processing means comprising means for measuring the phase pistons between the sub-pupils ($sp_j$) corresponding to said N beams and for applying phase corrections $c(\phi)$ to each of the N beams, by means of said N phase shifters so as to minimize said phase pistons, in order to deliver an optimized recombined laser beam as output;
wherein said processing means are capable of impressing on the output beam a wave surface profile approximated by phase pistons juxtaposed with said phase corrections, wherein said profile is a phase ramp.

12. A free-space telecommunication system, comprising a laser source with coherent recombination of N spatial monomode laser beams, comprising N phase shifters controlled by a phase-lock device, said phase-lock device comprising:
an optical device comprising means for taking at least a portion of each of said N beams, said optical device comprising an optical element for applying a phase deformation, and at least one matrix of detectors for detecting a first image of a wave surface corresponding to said N beams, and a second image deformed by said optical element; and
processing means for processing said first and second images, said processing means comprising means for measuring the phase pistons between the sub-pupils corresponding to said N beams and for applying phase corrections to each of the N beams, by means of said N phase shifters so as to minimize said phase pistons, in order to deliver an optimized recombined laser beam as output;
wherein said processing means are capable of impressing on the output beam ($f_R$) a wave surface profile approximated by phase pistons juxtaposed with said phase corrections; wherein said profile is a phase function for precorrecting the known perturbations of the recombined beam.

13. The laser source as claimed in claim 2, wherein the optical deforming element is an element for defocusing by a known distance.

14. The laser source as claimed in claim 2, wherein said processing means are capable of impressing on the output beam a wave surface profile approximated by phase pistons juxtaposed with said phase corrections.

15. The laser source as claimed in claim 3, wherein said processing means are capable of impressing on the output beam a wave surface profile approximated by phase pistons juxtaposed with said phase corrections.

16. The laser source as claimed in claim 4, wherein said processing means are capable of impressing on the output beam a wave surface profile approximated by phase pistons juxtaposed with said phase corrections.

17. The laser source as claimed in claim 5, wherein said processing means are capable of impressing on the output beam a wave surface profile approximated by phase pistons juxtaposed with said phase corrections.

18. The laser source as claimed in claim 6, wherein said processing means are capable of impressing on the output beam a wave surface profile approximated by phase pistons juxtaposed with said phase corrections.

19. The laser source as claimed in claim 13, wherein said profile is a phase function for precorrecting the known perturbations of the recombined beam.

20. The laser source as claimed in claim 13, comprising a two-dimensional array of gain media, wherein said profile is a phase function defined so as to focus the recombined beam into a spot of specified shape.

* * * * *